(12) United States Patent
Srsen et al.

(10) Patent No.: US 9,980,498 B2
(45) Date of Patent: May 29, 2018

(54) HYBRID BACON COOKING SYSTEM

(75) Inventors: Brian J. Srsen, Austin, MN (US); Richard M. Herreid, Austin, MN (US); James E. Mino, Austin, MN (US); Brian E. Hendrickson, Oakland, MN (US)

(73) Assignee: HORMEL FOODS CORPORATION, Austin, MN (US)

( * ) Notice: Subject to any disclaimer, the term of this patent is extended or adjusted under 35 U.S.C. 154(b) by 1054 days.

(21) Appl. No.: 13/207,065

(22) Filed: Aug. 10, 2011

(65) Prior Publication Data

US 2012/0040062 A1    Feb. 16, 2012

Related U.S. Application Data

(60) Provisional application No. 61/372,560, filed on Aug. 11, 2010.

(51) Int. Cl.
*A23L 1/01* (2006.01)
*A23B 4/044* (2006.01)
(Continued)

(52) U.S. Cl.
CPC .............. *A23B 4/044* (2013.01); *A21B 2/00* (2013.01); *A21B 7/00* (2013.01); *A23L 5/13* (2016.08); *A23L 5/15* (2016.08); *A23L 13/428* (2016.08)

(58) Field of Classification Search
CPC ........ A23L 1/01; A23L 1/0114; A23L 1/0128; A23L 1/0135; A23L 1/0142; A23L 1/0255
(Continued)

(56) References Cited

U.S. PATENT DOCUMENTS 1,395,015 A    10/1921    Rowell
2,402,674 A     6/1946    Schaffner
(Continued)

FOREIGN PATENT DOCUMENTS

CN    1334022 A    2/2002
EP    0650682 B1   8/1997
(Continued)

OTHER PUBLICATIONS

Underwood, G. et al., "Smoke Flavourings", *Raw Materials for Flavourings*, pp. 298-308 (2007).
(Continued)

*Primary Examiner* — Steven Leff
(74) *Attorney, Agent, or Firm* — Dicke, Billig & Czaja, PLLC

(57) ABSTRACT

A method of making precooked meat pieces using a hybrid cooking system comprises preheating meat pieces to a temperature of at least approximately 140° F. to create preheated meat pieces. The preheated meat pieces are transferred to an oven heated with an external heating source. The oven includes internal surfaces, and the external heating source assists in keeping the internal surfaces at a temperature below a smoke point of fat from the meat pieces. The preheated meat pieces are cooked in the oven to a water activity level of 0.92 or less to create precooked meat pieces. Optionally, flavoring could be applied to the precooked meat pieces after the precooked meat pieces have been removed from the oven and before the precooked meat pieces have cooled.

16 Claims, 4 Drawing Sheets

(51) Int. Cl.
*A21B 2/00* (2006.01)
*A21B 7/00* (2006.01)
*A23L 5/10* (2016.01)
*A23L 13/40* (2016.01)

(58) Field of Classification Search
USPC ............... 426/243, 509, 510, 641; 126/21 A
See application file for complete search history.

(56) References Cited

U.S. PATENT DOCUMENTS

| | | | |
|---|---|---|---|
| 3,212,426 A | 10/1965 | Lewus | |
| 3,409,447 A * | 11/1968 | Jeppson | A23L 1/0255 159/49 |
| 3,906,115 A | 9/1975 | Jeppson | |
| 3,961,568 A | 6/1976 | Jeppson | |
| 4,265,918 A | 5/1981 | Kueper et al. | |
| 4,556,572 A | 12/1985 | Kaufman, Jr. et al. | |
| 4,582,047 A | 4/1986 | Williams | |
| 4,731,938 A | 3/1988 | White | |
| 4,737,373 A | 4/1988 | Forney | |
| 4,867,994 A | 9/1989 | Perrine | |
| 4,935,282 A | 6/1990 | Pawlowski et al. | |
| 4,957,756 A | 9/1990 | Olander et al. | |
| 5,078,120 A | 1/1992 | Hwang | |
| 5,513,558 A | 5/1996 | Erickson et al. | |
| 5,514,396 A | 5/1996 | Mahboob | |
| 5,546,854 A | 8/1996 | Nakatani et al. | |
| 5,609,095 A | 3/1997 | Lemke et al. | |
| 5,960,703 A | 10/1999 | Jara et al. | |
| 6,045,841 A * | 4/2000 | Singh | A23L 1/3106 426/243 |
| 6,146,678 A | 11/2000 | Caridis et al. | |
| 6,152,024 A * | 11/2000 | Tippmann | 99/472 |
| 6,214,393 B1 | 4/2001 | Afman et al. | |
| 6,319,527 B1 * | 11/2001 | Purser | 426/63 |
| 6,586,030 B1 | 7/2003 | Smith | |
| 6,669,974 B2 | 12/2003 | Weldy et al. | |
| 2004/0086610 A1 * | 5/2004 | Allan Falk | A23L 1/317 426/243 |
| 2004/0131738 A1 | 7/2004 | Holm et al. | |
| 2005/0175749 A1 | 8/2005 | Gruis | |
| 2006/0127553 A1 | 6/2006 | van der Meer et al. | |
| 2006/0165862 A1 * | 7/2006 | Kunert | A23L 1/3182 426/523 |
| 2006/0225726 A1 | 10/2006 | Andoh et al. | |
| 2007/0023413 A1 | 2/2007 | Wilson | |
| 2008/0299274 A1 | 12/2008 | Dieckmann | |
| 2009/0181138 A1 * | 7/2009 | Howard | A23L 1/0121 426/233 |

FOREIGN PATENT DOCUMENTS

| | | |
|---|---|---|
| EP | 1 386 544 A1 | 2/2004 |
| GB | 140457 | 4/1921 |
| GB | 474022 | 10/1937 |
| GB | 754510 | 8/1956 |
| GB | 1092769 | 11/1967 |
| GB | 1 542 080 | 3/1979 |
| JP | 2000296167 | 10/2000 |
| JP | 200161655 | 3/2001 |
| JP | 2001204401 | 7/2001 |
| JP | 2003235473 | 8/2003 |
| JP | 2004121431 | 4/2004 |
| JP | 2004138345 | 5/2004 |
| JP | 2006102066 | 4/2006 |
| JP | 200764519 | 3/2007 |

OTHER PUBLICATIONS

Toth, L. et al., "Chemical Aspects of the Smoking of Meat and Meat Products", *Advances in Food Research,* vol. 29, pp. 87-158 (1984).
Van Deventer, Henk C. and Heijmans, Ruud M.H., Drying with Superheated Steam, Drying Technology: An International Journal, 2001, pp. 2033-2045, vol. 19, Issue 8, published online Feb. 6, 2007.
Jengkimbuan, Narong et al., A Comparative Study of Pork Drying Using Superheated Steam and Hot Air, Drying Technology: An International Journal, 2006, pp. 1665-1672, vol. 24, Issue 12, published online Apr. 18, 2007.
Morgan, Arthur I. et al. Ultra High Temperature, Ultra Short Time Surface Pasteurization of Meat, Journal of Food Science, Nov. 1996, pp. 1216-1218, vol. 61, Issue 6.

* cited by examiner

FIG. 3

Lab analysis of finished product.

| Sample | Aw | % moist. | % Salt | % Sugar |
|---|---|---|---|---|
| AP Microwave Oven | .85 | 21.12 | 3.08 | 2.39 |
| R&D Super Heated Steam (SHS) oven | .85 | 21.29 | 2.75 | 1.97 |
| R&D SHS oven with atomizer | .85 | 24.06 | 3.16 | 2.66 |
| R&D Microwave/SHS Hybrid system | .85 | 27.66 | 4.00 | 2.74 |

FIG. 4
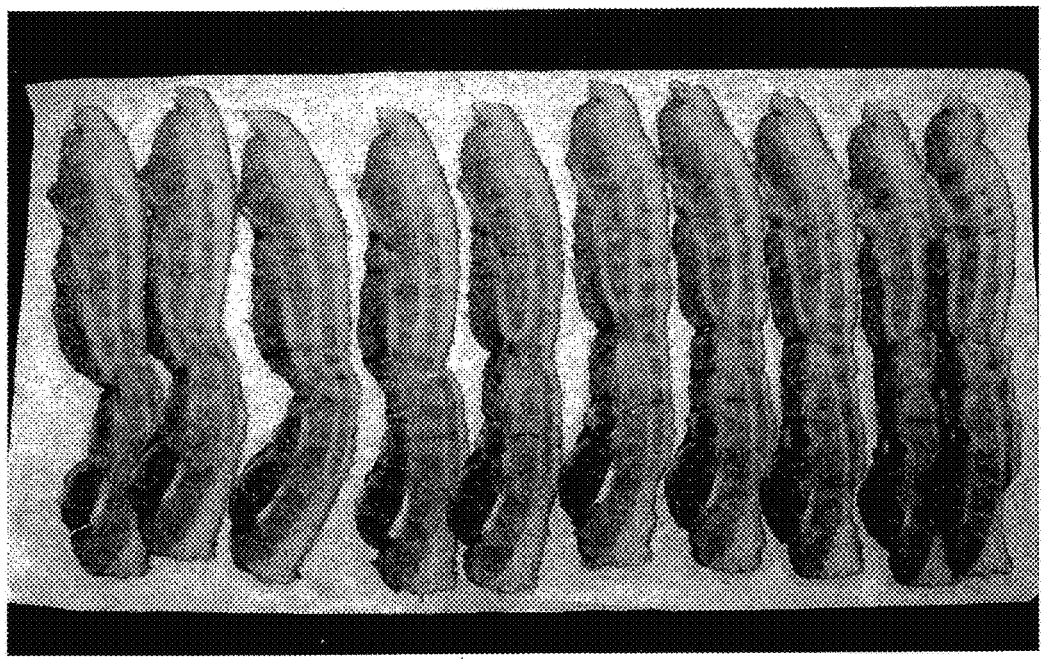
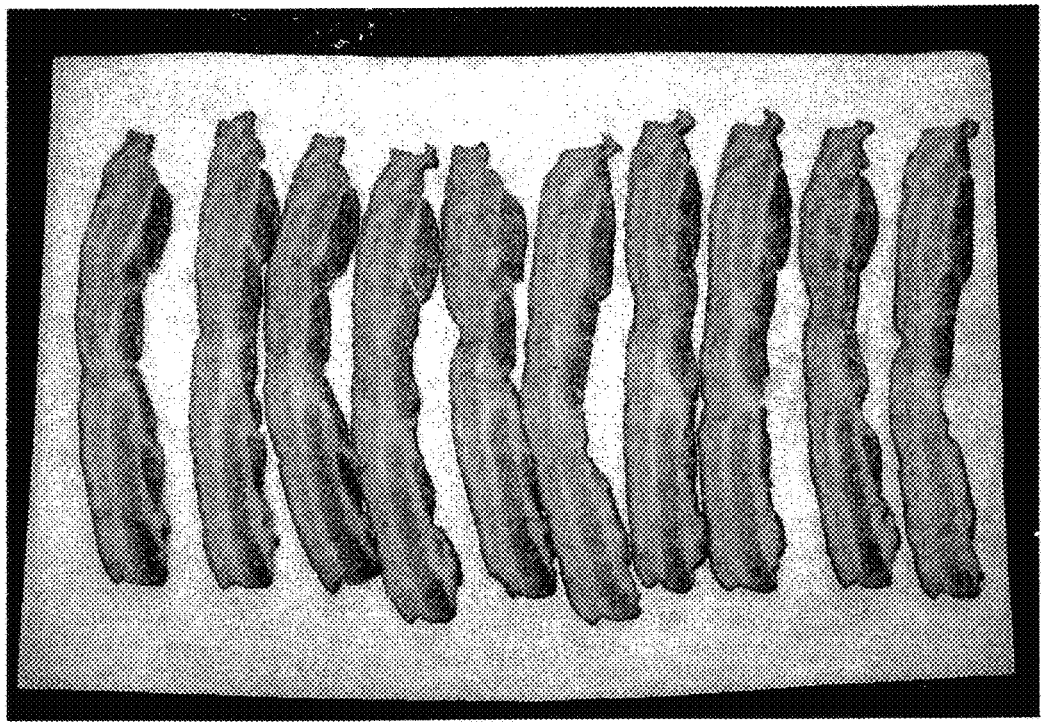
FIG. 5

HYBRID BACON COOKING SYSTEM

CROSS-REFERENCE TO RELATED APPLICATIONS

This application claims the benefit of U.S. Provisional Application Ser. No. 61/372,560, filed Aug. 11, 2010, which is incorporated in its entirety herein by reference.

BACKGROUND OF THE INVENTION

This invention relates generally to the cooking of bacon and, more particularly, to the cooking of bacon using a hybrid cooking system, which includes preheating the bacon using a first system and then followed by using a second system to fully cook the bacon.

There are several ways of preparing bacon wherein the producer cooks the bacon prior to sale to the customer or consumer. This is referred to as precooked bacon. One typical way of making precooked bacon is to use microwave heating. Typically, multiple microwave ovens are arranged in series with a conveyor running through them to form a continuous cooking system. This provides for a fast cooking process and provides an economical way of producing precooked bacon. However, there have been instances where the appearance and the texture of the precooked bacon, cooked by microwave, could be improved. For example, the finished product tends to be tough in texture and has char marks on the slices proximate the locations of the cure solution injection sites. Another way of making precooked bacon is to use continuous spiral ovens with a heated gas such as hot air or steam which is circulated in the oven to heat and cook the bacon slices. Such ovens commonly use electrical heating elements or thermal oil heat exchangers to heat the circulating gas. These heating surfaces are typically much hotter than the target temperature for the circulating gas to increase the efficiency of heat transfer. For example, an oven with an air temperature setting of 350° F. would have the heating surface temperature of at least 450° F. However, such systems also may have issues with texture and retention of flavor. Although the texture is somewhat improved and char marks are eliminated by using electrically or thermal oil heated spiral ovens with steam, it has been noted, for example, that the flavor changed in a negative way by having an off flavor and the flavor intensity of the cure solution was noticeably reduced.

Further, smoke is typically applied to bacon bellies before slicing and cooking in microwave ovens. These ovens typically have conveyor belts on top of the bacon to hold the bacon in place on the lower transport conveyor belt. Therefore, it is not possible to add smoke in the microwave oven since the top and bottom belts prevent the smoke from reaching the bacon slices. Smoke can be applied to the bacon belly or to the slices in a heated spiral oven during cooking. When smoke is applied before slicing and cooking only the edges of the sliced bacon have significant smoke flavor. Whether applied before cooking or during the cooking of the slices, the smoke can darken the meat and/or develop a bitter flavor because of reactions that occur at the high temperatures of bacon cooking. Smoke applied to sliced bacon in a continuous oven also loses a significant amount of flavor and aroma with the heat and high air flow in the continuous oven. In addition, there are problems with smoke coating the inside of the oven.

For the reasons stated above and for other reasons stated below, which will become apparent to those skilled in the art upon reading and understanding the present specification, there is a need in the art for an improved bacon cooking system.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

One embodiment method of making precooked meat pieces using a hybrid cooking system comprises preheating meat pieces to a temperature of at least approximately 140° F. to create preheated meat pieces. The preheated meat pieces are transferred to an oven heated with an external heating source. The oven includes internal surfaces, and the external heating source assists in keeping the internal surfaces at a temperature below a smoke point of fat from the meat pieces. The preheated meat pieces are cooked in the oven to a water activity level of 0.92 or less to create precooked meat pieces.

One embodiment method of making precooked bacon pieces using a hybrid cooking system comprises preheating bacon pieces with a microwave oven to a temperature of at least approximately 140° F. to create preheated bacon pieces. The preheated bacon pieces are transferred to an oven heated with steam from an external steam generator. The oven includes internal surfaces, and the steam assists in keeping the internal surfaces at a temperature below 375° F. The preheated bacon pieces are cooked in the oven to a water activity level of 0.92 or less to create precooked bacon pieces.

One embodiment method of flavoring meat pieces comprises cooking meat pieces with a heat source to a water activity level of 0.92 or less to create precooked meat pieces and applying flavoring to the precooked meat pieces after the precooked meat pieces have been removed from the heat source and before the precooked meat pieces have cooled. The flavoring is applied using an applicator selected from the group consisting of a vaporizer and an atomizer.

One embodiment externally heated oven comprises an oven compartment, a fan in fluid communication with the oven compartment, and an external heat generator operatively connected to the oven compartment. The external heat generator is controlled by an oven temperature control system.

BRIEF DESCRIPTION OF THE DRAWINGS

The present invention can be more easily understood, and further advantages and uses thereof can be more readily apparent, when considered in view of the detailed description and the following Figures in which:

FIG. 3 is a table showing a lab analysis of finished precooked product under various systems;

FIG. 4 is a photograph of precooked bacon that has been prepared using only a microwave system; and FIG. 5 is a photograph of precooked bacon prepared using the hybrid system of the present invention.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
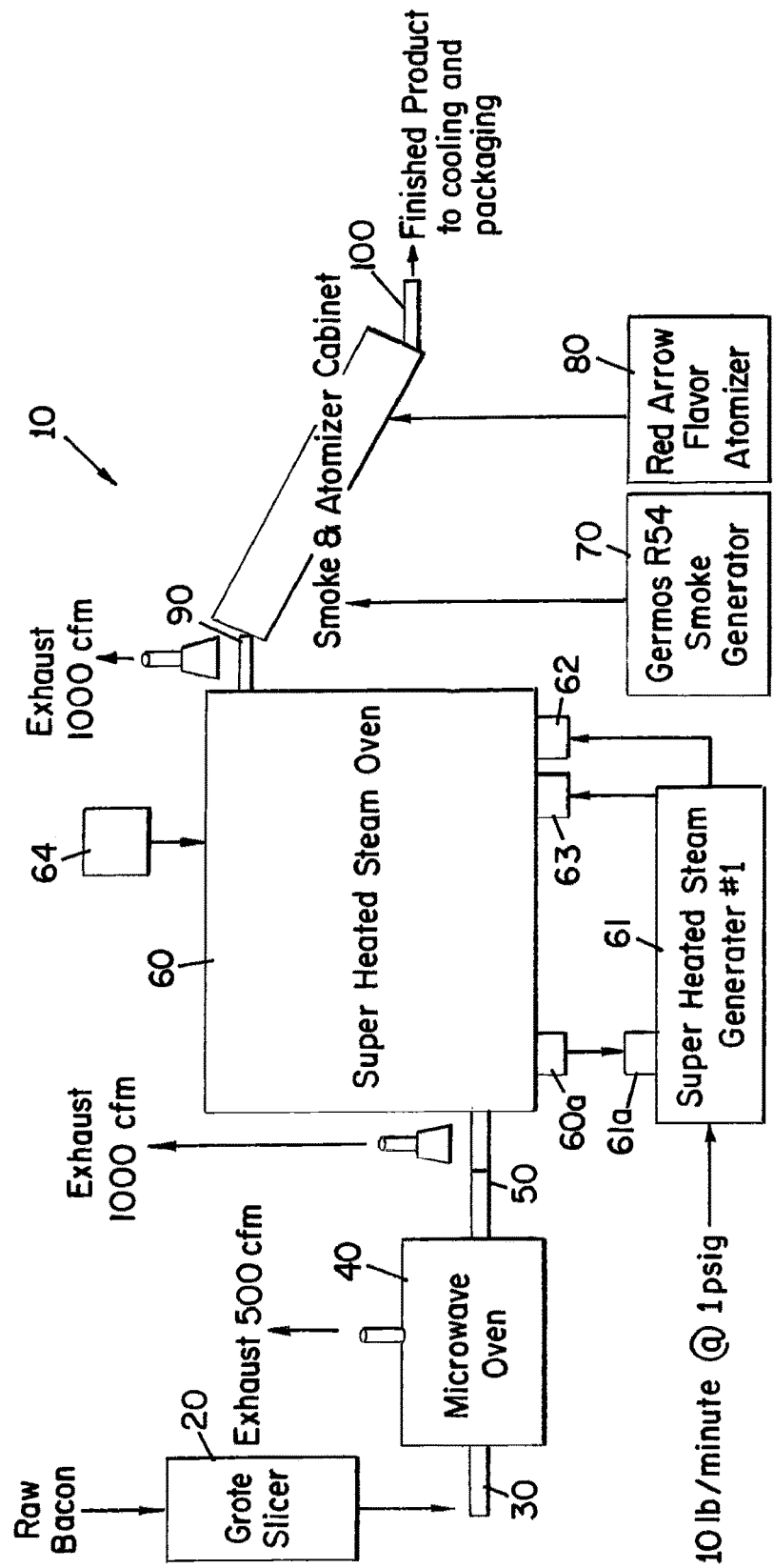
FIG. 1 is a schematic diagram of a hybrid bacon cooking system according to the principles of the present invention.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide a hybrid cooking system for meat pieces, which includes preheating the meat pieces using a first system and then followed by using a second system to fully cook the meat pieces to a water activity level of 0.92 or less.

Although the term "bacon slices" is used throughout this description, it is understood that other types of meat pieces such as, but not limited to, bacon pieces, breakfast strips, and turkey bacon could be used.

By using electrically heated spiral ovens with steam, it has been noted, for example, that the flavor changed in a negative way by having an off flavor and the flavor intensity of the cure solution was noticeably reduced. As a result of the present invention, it has been determined that the off flavor was the result of the fat atomizing into the oven compartment and contacting the hot surfaces of the electrical heating elements that can reach temperatures of approximately 1000° F. Because the smoke point of bacon fat is approximately 375° F., the fat contacting the electrical heating elements burned and created smoke within the oven compartment, which negatively affected the flavor of the cooked bacon.

The inventors of the present invention found that using an external heat source of superheated steam, rather than internal electrical heating elements and steam, eliminated the off flavor. The external heat source of superheated steam kept the surfaces within the oven below the 375° F. smoke point of bacon fat and provided a more efficient heat transfer of steam for cooking. In addition, using an external heat source significantly reduces the risk of fire within the oven.

To address the dilution of the cure flavor, the inventors of the present invention determined that by including a preheating step using a microwave oven, the cold slices of bacon were heated enough to reduce the amount of condensation that formed on the slices of bacon as they entered the superheated steam oven and the fat that melted during the preheating step formed a barrier around the slices of bacon so that any condensation that did form was kept from contacting the bacon under the fat so that the flavor under the fat barrier was not diluted and washed off.

Optionally, to enhance the flavor of the bacon slices, it was determined by the inventors of the present invention that adding smoke or flavor after the bacon slices were fully cooked to the desired water activity level, in a vaporized/atomized form, the aroma and delicate flavors of the smoke or flavor are retained on the bacon slices since the bacon slices are warm enough to have the smoke or flavor adhere quickly thereto but are in the process of cooling down so the volatile aromas are not lost.

In one embodiment, referring to FIG. 1, there is generally disclosed at 10 a hybrid bacon cooking system. Bacon bellies, which have been treated with a cure solution well known in the art and may or may not be heat processed, are sliced using a Grote slicer 20, or other suitable slicer, and the bacon slices are carried on a belt 30 into a microwave oven 40. Preferably, the bacon bellies are sliced at a thickness of 0.25 inch or less. In the microwave oven 40, as will be described more fully hereafter, the sliced bacon is preheated to a temperature of at least approximately 140° F. to 210° F. An example of a suitable microwave oven that could be used is the AMTek Microwave System, Model # MWO 2404-75, manufactured by Applied Microwave Technology, Inc. of Cedar Rapids, Iowa. The preheated bacon slices are then transferred onto a conveyor 50 that is part of a superheated steam oven 60.

An example of a suitable superheated steam oven 60 that could be used is a Mini Spiral Oven manufactured by Unitherm Food Systems, Inc. of Bristow, Okla., that has been modified by eliminating the use of the electrical heating elements and using externally heated steam instead during cooking. The superheated steam oven 60 includes a superheated steam generator 61 that supplies the superheated steam to the superheated steam oven 60. An example of a suitable superheated steam generator is Model # WH-753496DS manufactured by Applied Thermal Systems, Inc. of Brooklyn Park, Minn. The superheated steam is injected at a rate sufficient to maintain the desired temperature into the steam oven 60 through the factory steam inlet port 62 and an additional secondary steam inlet port 63 positioned proximate the factory steam inlet port, and the steam is distributed through the steam oven 60 by the factory steam distribution manifold and a secondary steam distribution manifold, which are operatively connected to the respective inlet ports 62 and 63, to accommodate the higher steam flow to maintain the desired oven temperature at maximum production rates. The secondary steam distribution manifold was added diagonally along the bottom of the steam oven 60. Because the Mini Spiral Oven was modified, an additional inlet and manifold were added so that the factory steam inlet port was not overloaded. It is recognized that the additional inlet and manifold may not be needed if another type of oven is used or if an oven is manufactured for this purpose. It is also recognized that the oven could be a batch type oven or be part of a continuous cooking system.

The temperature within the steam oven 60 is controlled by controlling the heating elements of the generator 61 and by controlling the flow rate into the oven 60. More specifically, the temperature within the steam oven 60 is controlled by sending a temperature setpoint value from the oven control panel 60a to the superheated steam generator temperature control panel 61a. The oven control panel 60a adjusts the temperature setpoint signal to maintain the target temperature inside the steam oven 60. It is recognized that another type of oven temperature control system could be used such as, but not limited to, a single control panel. Any excess steam escapes the steam oven 60 via the conveyor inlet and outlet openings and is carried away by exhaust hoods located above each opening. The superheated steam is approximately 400 to 1000° F. when it leaves the generator 61, and the steam equilibrates within the oven 60 to the desired temperature. The superheated steam is not re-circulated but rather fresh superheated steam is used. The oven 60 includes a fan 64 in fluid communication with the steam oven 60 to circulate the gas/steam, which is exhausted out of the oven 60. The heating elements within the oven 60 are not used except optionally to preheat the oven prior to introducing bacon. The bacon slices are cooked in the steam oven 60 to a water activity level of 0.92 or less to create precooked bacon.

Optionally, a smoke generator 70 and/or a flavor atomizer 80 may be added to the precooked bacon after it has exited the superheated steam oven 60 on a conveyor 90 in a cabinet. An example of a suitable smoke generator is Model # R54 manufactured by GERMOS-Fessmann GmbH & Co KG of Remshalden, Germany. To create the smoke within the cabinet, hardwood chips were used in the smoke generator at a burn rate of 25 pounds per hour. An example of a suitable flavor atomizer is Red Arrow Power Smoker, Model #100 Deluxe, manufactured by the Red Arrow Equipment Company, Inc., of Manitowoc, Wis. An example of a suitable flavor for use with the flavor atomizer is maple flavor or honey flavor from WILD Flavors, Inc. of Erlanger, Ky. applied as an atomized fog within the cabinet. Alternatively, a solution of 30% sugar, 10% salt, and 60% water could be atomized at a flow rate of 4 gallons per hour through the Red Arrow Power Smoker. The smoke from the smoke generator and the atomized flavor are applied while the product is still hot so that it absorbs well as the bacon cools. Because the flavoring of smoke and/or flavor is applied after the bacon has been fully cooked and because the flavoring is in vaporized/atomized form, the volatile aromatic notes are retained. Preferably, the flavoring is applied for 10 to 20 seconds and it is vaporized/atomized, not sprayed. The finished product, after the optional flavoring has been added, is then transferred, via conveyor 100, where it is then cooled and packaged by any suitable means well known in the art.

Although superheated steam is described herein, it is recognized that any other suitable external heat source could be used such as, but not limited to, nitrogen or air as long as the grease/fat is filtered so that it does not come into contact with the heating surface.

Preheating the sliced bacon with a microwave oven, or other suitable heating methods such as infrared or hot air, prior to fully cooking the sliced bacon in a superheated steam oven minimizes condensation on the sliced bacon surfaces. The preheating begins to melt the fat portion of the sliced bacon which encases the sliced bacon in melted fat. The melted fat acts as a barrier that, along with the increased temperature of the bacon slice, minimizes the amount of moisture condensation on the surface of the sliced bacon when the sliced bacon is cooked in the superheated steam oven and reduces the amount of condensation that contacts the bacon under the melted fat. The cooking process time of the hybrid cooking system is less than that of just the superheated steam oven. See Example 1 below for an example of the reduced processing time.

Example 1

Raw bacon slices, sliced to 7 slices per inch, were cooked in a superheated steam oven at an oven temperature of 375° F. The cooking time was eight minutes to reach a water activity level of approximately 0.85. Raw bacon slices, sliced to 7 slices per inch, were also cooked using a hybrid system including a 14 kW preheat microwave oven for 55 seconds and then a superheated steam oven at a temperature of 350° F. for five minutes, which resulted in a precooked bacon with a similar water activity level of approximately 0.85. The overall processing time for the hybrid system was 5 minutes 55 seconds as compared to 8 minutes for the superheated steam oven only.

Example 2

Figure 2:
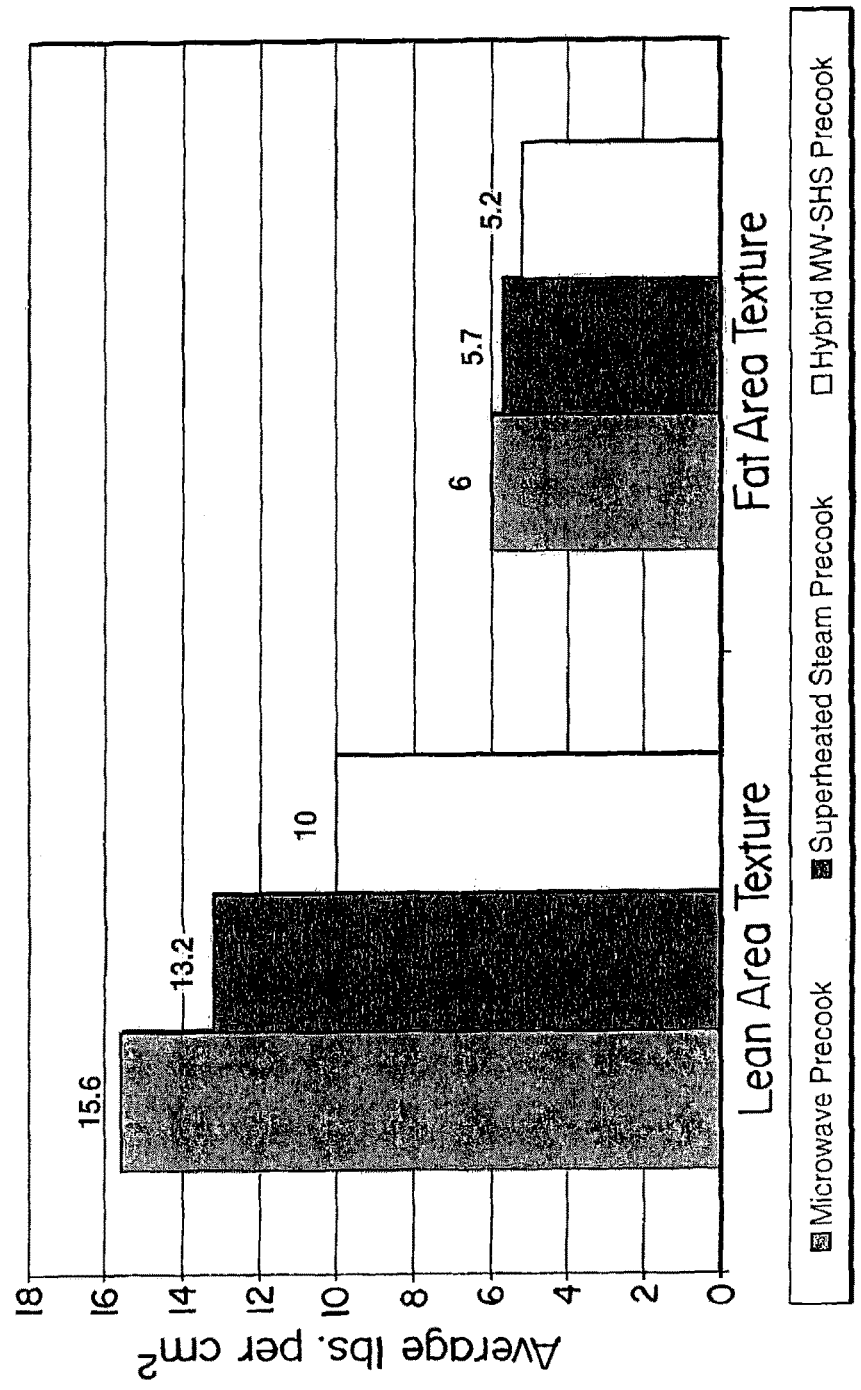
FIG. 2 is a graph showing a comparison of precooked bacon texture under three different bacon cooking systems.

Referring now to FIG. 2, precooked bacon was made using three different methods. The first method was a microwave oven, the second method was a superheated steam oven, and the third method was a hybrid system in accordance with the present invention wherein both a microwave oven and a superheated steam oven were used. The microwave oven only precooked bacon had a texture measured in pounds of force per $cm^2$ of 15.6 for the lean area and 6 for the fat area. The superheated steam only precooked bacon had a texture measured in pounds of force per $cm^2$ of 13.2 for the lean area and 5.7 for the fat area. However, the hybrid system precooked bacon had a texture measured in pounds of force per $cm^2$ of 10 for the lean area and 5.2 for the fat area thereby showing an improvement in texture of the final precooked bacon product.

Example 3

Referring now to FIG. 3, there is a lab analysis of four different systems. The first is labeled "AP Microwave Oven" and it is for a microwave only system. The second is labeled "R&D Super Heated Steam (SHS) oven" and utilizes superheated steam only. The third is labeled "R&D SHS oven with atomizer", which is also a superheated steam only system with an atomizer added. Finally, the fourth is labeled "R&D Microwave/SHS Hybrid system", which is the system in accordance with the present invention. The analysis of each product shows a similar water activity level (Aw) of approximately 0.85. From the analysis of the percentages of moisture, salt, and sugar content, it can be seen that for the hybrid system in accordance with the present invention there is increased retention of moisture, salt, and sugar when compared to the other cooking systems.

Example 4

Referring now to FIGS. 4 and 5, it can be seen that the appearance of the precooked bacon shown in FIG. 5, which was made by the hybrid system in accordance with the present invention, is superior to the microwave only system shown in FIG. 4 in that there is the elimination of char marks, typical in microwave only cooking systems.

Example 5

Another test was conducted to compare the flavor and aroma of precooked bacon cooked in a standard continuous spiral oven with precooked bacon cooked using the hybrid cooking system in accordance with the present invention.

For this test, the same bacon was used in both cooking systems. The belly type was Item No. 23508 obtained from the Austin, Minn. plant of Hormel Foods Corporation. The slice thickness was 7 slices per inch.

The settings for the process using the standard continuous spiral oven, Mini Spiral Oven manufactured by Unitherm Food Systems, Inc. of Bristow, Okla., were 30 slices per minute at 7 slices per inch. The oven temperature was set at 350° F., and internal electrical heating elements were used to maintain this temperature. Steam was injected into the oven at 5 pounds per minute which produced a steam level in the oven of at least greater than 90%, and the recirculation fan speed was set at high (60 hz). The cook time was 8.8 minutes.

For the process using the hybrid cooking system, an AMTek Microwave System, Model # MWO 2404-75, manufactured by Applied Microwave Technology, Inc. of Cedar Rapids, Iowa, was used for the preheating step and a Mini Spiral Oven manufactured by Unitherm Food Systems, Inc. of Bristow, Okla. that was modified by eliminating the use of the electrical heating elements and externally heated steam instead was used to maintain the oven temperature. The source of the externally heated steam was a Superheated Steam Generator, Model # WH-753496DS, manufactured by Applied Thermal Systems, Inc. of Brooklyn Park, Minn. The settings for this process were 20 slices per minute at 7 slices per inch. The power setting for the microwave oven was 9 kw, and the time setting for the microwave oven was 53 seconds. The superheated steam oven temperature was set at 350° F. Steam was injected into the oven at approximately 10 pounds per minute at 700° F., and the recirculation fan speed was set at high (60 hz). The cook time in the superheated steam oven was 7.7 minutes.

Samples of finished product were taken from each process. Bacon slices were placed on parchment paper and packaged using a nitrogen gas flushed Mulivac roll stock machine. The samples from the oven only cooking system were numbered in the order in which they were produced so that samples from the beginning, middle, and end of the test could be identified. For all sample packages submitted to the sensory panel, there were 10 slices per sheet of parchment paper and there were 2 sheets of parchment paper placed in each package. A total of 65 packages were collected and numbered in the order in which they were produced. Package numbers 1 through 5 were submitted as the beginning of the test cook, package numbers 25 thru 30 were submitted as the middle of the test cook, and package numbers 60 thru 65 were submitted as the end of the test cook.

A set of four samples were submitted for a Descriptive Evaluation Panel, which comprised of 8 people trained to taste various attributes in bacon. Testing was done over three days. The four samples were 1) spiral oven only cooking system using electrical heating elements at the beginning of 90 minute run; 2) cooking system from 1) at the middle of 90 minute run; 3) cooking system from 1) at the end of 90 minute run; and 4) hybrid cooking system at the end of 180 minute run.

The samples were placed on parchment lined trays and heated in an oven, which was preheated to 400° F., for four minutes. The heated bacon was placed directly under warming lamps, equipped with red infrared heat lamps, for serving. The bacon was not drained or blotted. The bacon was served warm and, for each serving, the panelist was given one slice of bacon on a paper plate. The panelists evaluated each product, one at a time, and returned the unused portion of the product. Each product evaluation was followed by a 5 minute rest interval, during which time the panelist was provided with a cracker and water with lemon for rinsing her/his mouth. The panelists evaluated each product four times according to a balanced serving order. All four products were analyzed through Analysis of Variance.

The following Tables 1 and 2 summarize the aroma and flavor attributes evaluated by the Descriptive Evaluation Panel. Appearance, texture/mouthfeel, and aftertaste/aftereffects attributes were also evaluated by the panel, but because these were not the primary focus of the present invention, only the aroma and flavor attributes are being described herein. The higher the attribute score number, the more intense the attribute was perceived by the panel members. The positive aroma attributes are smoke aroma, sweet aroma, and salt aroma. The negative aroma attributes are fat aroma, old meat aroma, burnt aroma, and artificial aroma. The positive flavor attributes are smoke flavor, sweet flavor, and salt flavor. The negative flavor attributes are fat flavor, old meat flavor, and artificial flavor.

TABLE 1

Means for Aroma Attributes

| Attribute Description | Spiral Oven with Electrical Elements, Beginning of Run | Spiral Oven with Electrical Elements, Middle of Run | Spiral Oven with Electrical Elements, End of Run | Hybrid Oven, End of Run |
|---|---|---|---|---|
| Smoke Aroma | 25.47 | 22.22 | 19.84 | 29.22 |
| Fat Aroma | 18.47 | 21.22 | 20.22 | 18.66 |
| Sweet Aroma | 11.91 | 7.94 | 8.66 | 13.41 |
| Old Meat Aroma | 4.75 | 6.78 | 10.31 | 4.28 |
| Salt Aroma | 6.31 | 6.12 | 4.56 | 7.47 |
| Burnt Aroma | 3.47 | 3.91 | 2.88 | 3.62 |
| Artificial Aroma | 4.88 | 5.44 | 8.94 | 5.28 |

TABLE 2

Means for Flavor Attributes

| Attribute Description | Spiral Oven with Electrical Elements, Beginning of Run | Spiral Oven with Electrical Elements, Middle of Run | Spiral Oven with Electrical Elements, End of Run | Hybrid Oven, End of Run |
|---|---|---|---|---|
| Smoke Flavor | 21.72 | 21.41 | 19.12 | 29.22 |
| Salt Flavor | 19.84 | 20.75 | 19.72 | 30.03 |
| Sweet Flavor | 12.72 | 13.91 | 12.16 | 18.16 |
| Fat Flavor | 19.56 | 23.56 | 24.59 | 24.06 |
| Old Meat Flavor | 5.62 | 5.25 | 8.91 | 3.47 |
| Artificial Flavor | 5.16 | 4.50 | 8.38 | 5.00 |

The results of the Descriptive Evaluation Panel indicated that there is a detectable off flavor created in the electrically heated spiral oven test samples, and the off flavor increased in intensity as the test run progressed. There was also a noted reduction in the salt and sugar flavor intensity in the electrically heated spiral oven test samples when compared to the hybrid system test samples.

Generally, with regard to the electrically heated spiral oven test samples, over the run from beginning to end, the samples decreased in smoke aroma, had lighter lean color, and had a more uniform, rectangular shape. Samples from the beginning of the run, as opposed to the middle and the end of the run, appeared leaner, less greasy, and shorter in length and they had less juicy fat texture, required more chewing to swallow, and had less fat aftertaste. Samples from the middle of the run, as opposed to the beginning and the end of the run, appeared more rippled/wavy and were crisper.

Generally, on average, the test samples from the hybrid process had more smoke aroma, had longer slice length, were less rubbery, had more juicy fat texture, had more smoke and salt flavor and aftertaste, had lower water activity levels, and had higher sugar/sucrose and salt/sodium contents.

It was determined that keeping the surface areas within the oven compartment below the smoke point of bacon fat, below 375° F., resulted in producing precooked bacon with reduced off flavors. To accomplish this, externally heated steam was used to provide the energy required to fully cook bacon. The superheated steam quickly equilibrates to the desired oven temperature without creating surface temperatures above 375° F. within the oven compartment.

It was also determined that preheating the bacon slices prior to entering the superheated steam oven improves the flavor intensity of the finished bacon.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A method of making precooked bacon pieces using a hybrid cooking system, comprising:
    preheating bacon pieces with a microwave oven to a temperature of 140° F. to 210° F. to create preheated bacon pieces, the preheating forming a barrier with melted fat around the preheated bacon pieces and reducing an amount of condensation that forms on the preheated bacon pieces when transferred to a cooking compartment of an oven, the barrier preventing any condensation that forms from contacting the preheated bacon pieces under the melted fat and diluting flavor in the preheated bacon pieces;
    transferring the preheated bacon pieces to the cooking compartment of the oven, the cooking compartment heated with steam from an external steam generator, the external steam generator being external to the cooking compartment, the steam being injected into the cooking compartment and being approximately 400° F. to 1000° F. when the steam leaves the external steam generator, the cooking compartment including internal surfaces, the steam assisting in keeping the internal surfaces at a temperature below 375° F. thereby reducing off flavors during cooking in the cooking compartment; and
    cooking the preheated bacon pieces in the cooking compartment to a water activity level of 0.92 or less to create precooked bacon pieces.

2. The method of claim 1, wherein the bacon pieces are bacon slices created from slicing bacon bellies to a thickness of approximately 0.25 inch or less.

3. The method of claim 1, wherein a steam level in the cooking compartment is at least greater than 90%.

4. The method of claim 1, further comprising a heating element within the cooking compartment of the oven to preheat the cooking compartment.

5. A method of making precooked meat pieces using a hybrid cooking system, comprising:
    preheating meat pieces in a first cooking compartment using a preheating method selected from the group consisting of a microwave oven, an infrared oven, and hot air to a temperature of at least 140° F. to create preheated meat pieces, the preheating forming a barrier with melted fat around the preheated meat pieces and reducing an amount of condensation that forms on the preheated meat pieces when transferred to a second cooking compartment, the barrier preventing any condensation that forms from contacting the preheated meat pieces under the melted fat and diluting flavor in the preheated meat pieces;
    transferring the preheated meat pieces to the second cooking compartment, the second cooking compartment heated with an external heating source, the external heating source being external to the second cooking compartment, the second cooking compartment including internal surfaces, the external heating source assisting in keeping the internal surfaces at a temperature below a smoke point of fat from the meat pieces thereby reducing off flavors during cooking in the second cooking compartment; and
    cooking the preheated meat pieces in the second cooking compartment to a water activity level of 0.92 or less to create precooked meat pieces.

6. The method of claim 5, wherein the meat pieces are preheated to a temperature of 140° F. to 210° F. to create the preheated meat pieces.

7. The method of claim 5, wherein the meat pieces are bacon slices created from slicing bacon bellies to a thickness of approximately 0.25 inch or less.

8. The method of claim 7, wherein the internal surfaces of the second cooking compartment are kept below 375° F.

9. The method of claim 5, wherein the meat pieces are preheated in the first cooking compartment using the microwave oven.

10. The method of claim 5, wherein the second cooking compartment is heated with steam.

11. The method of claim 10, wherein the steam is heated with an external steam generator, the steam is injected into the second cooking compartment, and the steam is approximately 400° F. to 1000° F. when it leaves the external steam generator.

12. The method of claim 11, wherein a steam level in the second cooking compartment is at least greater than 90%.

13. A method of making precooked meat pieces using a hybrid cooking system, comprising:
    preheating meat pieces with a microwave oven to a temperature of at least 140° F. to create preheated meat pieces, the preheating forming a barrier with melted fat around the preheated meat pieces and reducing an amount of condensation that forms on the preheated meat pieces when transferred to a cooking compartment of an oven, the barrier preventing any condensation that forms from contacting the preheated meat pieces under the melted fat and diluting flavor in the preheated meat pieces;
    transferring the preheated meat pieces to the cooking compartment of the oven heated with steam from an external steam generator, the external steam generator being external to the cooking compartment, the steam being injected into the cooking compartment and being approximately 400° F. to 1000° F. when the steam leaves the external steam generator, the cooking compartment including internal surfaces, the external heating source assisting in keeping the internal surfaces at a temperature below a smoke point of fat from the meat pieces thereby reducing off flavors during cooking in the cooking compartment; and
    cooking the preheated meat pieces in the cooking compartment to a water activity level of 0.92 or less to create precooked meat pieces.

14. The method of claim 13, wherein the meat pieces are preheated to a temperature of 140° F. to 210° F. to create the preheated meat pieces.

15. The method of claim 13, wherein the meat pieces are bacon slices created from slicing bacon bellies to a thickness of approximately 0.25 inch or less.

16. The method of claim 15, wherein the internal surfaces of the cooking compartment are kept below 375° F.

* * * * *